United States Patent [19]

Ju

[11] Patent Number: 4,543,841
[45] Date of Patent: Oct. 1, 1985

[54] POWER MACHINE

[76] Inventor: Cho H. Ju, 361-40, Sang Do Dong, Dong Juck Ku, Seoul, D.P.R. of Korea

[21] Appl. No.: 349,463

[22] Filed: Feb. 17, 1982

[30] Foreign Application Priority Data

Feb. 17, 1981 [KP] D.P.R. of Korea .............. 1981-481

[51] Int. Cl.$^4$ .................... F16H 55/14; F16H 57/00; F16H 1/12; F16D 23/10
[52] U.S. Cl. ........................................ 74/461; 74/410; 74/411; 74/394; 74/421 R; 192/105 BB
[58] Field of Search ............... 74/461, 460, 457, 405, 74/394, 439, 336 R, 411, 421 R, 410; 173/94, 98; 192/105 BB, 105 BA, 103 B

[56] References Cited

U.S. PATENT DOCUMENTS

| | | | |
|---|---|---|---|
| 548,551 | 10/1895 | Huffman | 74/461 |
| 782,628 | 2/1905 | Taylor | 74/461 |
| 1,744,576 | 1/1930 | Rhett | 74/461 |
| 1,985,503 | 12/1934 | Keller | 192/105 BB |
| 3,373,626 | 3/1968 | Maurer et al. | 74/665 B |
| 3,515,247 | 6/1970 | Smith | 192/105 BA |
| 3,677,380 | 7/1972 | Kirschey | 192/105 BA |

*Primary Examiner*—Lawrence J. Staab
*Assistant Examiner*—Michael D. Bednarek
*Attorney, Agent, or Firm*—Birch, Stewart, Kolasch & Birch

[57] ABSTRACT

A power-machine comprising a plurality of driving gears positioned around a driven gear, each driving gear including a plurality of radially sliding teeth spaced equidistant about the outer circumference of the driving gear, such that centrifugal force created by the rotational movement of the driving gears will move the radially sliding teeth radially outward of the driving gears to contact and thereby accelerate the drive gear.

4 Claims, 6 Drawing Figures

POWER MACHINE

FIELD OF THE INVENTION

The present invention relates to a power-machine comprising a plurality of driving gears positioned around a driven gear, each driving gear including a plurality of radially sliding teeth spaced equidistant about the outer circumference of the driving gear, such that centrifugal force created by the rotational movement of the driving gears will move the radially sliding teeth radially outward of the driving gears to contact and thereby accelerate the rotation of the drive gear.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

The present invention relates to a power machine which is capable of providing an external force for altering the kinetic state of an object which is moving or for initiating the movement of an object which is in a resting state. For such a purpose, it is necessary that the external force be sufficient for altering the acceleration of the object, that is, the external force must increase the acceleration by a measurable magnitude. Without the addition of such an external force for altering the acceleration of an object, the inertia of the object would maintain the existing kinetic state of the object whether at rest or in motion.

In theory then, the direction of the force and acceleration of a moving object are coincident and the magnitude of the force is directly proportional to the mass of the object. That is, the force is the product of the mass of an object and the acceleration or $f=ma$; wherein f is force, m is mass and a is acceleration.

Figure 1:
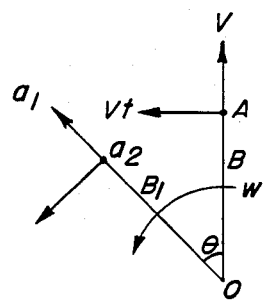
FIGS. 1 and 2 explain the basic principles on which the present invention is based.

For an object which is rotating, the radius of the object is fixed and furthermore, the direction of movement for the radius is also fixed. As shown in FIG. 1, assume that the rotating object has a center O with a slider A positioned along the line B which is rotated such that: W=the rotational velocity of line B; and V is assumed at a sliding velocity of the slider A. Then, after a time t, the line B will travel or turn a rotational distance V where $V=wt$ and the slide valve A will move along the direction of the arrow $B_1$ to position $a_1$. Thus, when line B is rotated, the slider A is moved in the circumferential direction to position $a_2$ and radially to the position $a_1$.

Figure 2:
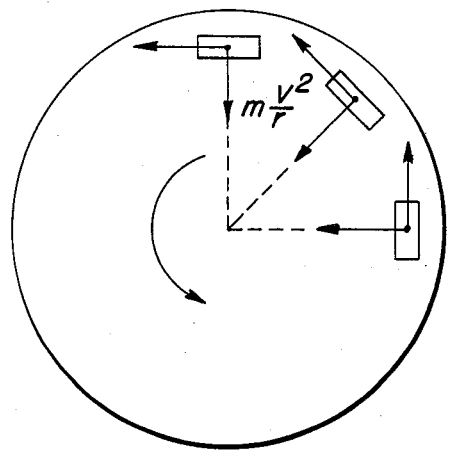

When an object moves at several velocities W about a circumference having a radius r, the inertia of the object will always tend to create a slide velocity $\theta = rw$ tangential to the radius r. Thus if the motion of the object is to be maintained about the circumference, a force equal to the centripetal acceleration $V^2/r = rW^2$ must be added in the radial direction. This situation is diagrammed in FIG. 2, where the rotational movement creates a tangential force and maintaining the rotation of the object about the circumference requires application of a centripetal force toward the center which counters an equal centrifugal force in the opposite outward direction.

Thus, if the mass of the rotated object is m, then the magnitude of the centripetal force to be added in the radial direction must be $(mV^2)/r = mrW^2$. This then is the value of the centrifugal force which is always created in the outward radial direction by the inertia of an object moving in a circular direction.

Accordingly, the power machine of the present invention includes a radially sliding teeth which utilizes the centrifugal force to create rotational acceleration and prevents loss of power by transmitting power to the follower and radially sliding teeth.

Figure 3:
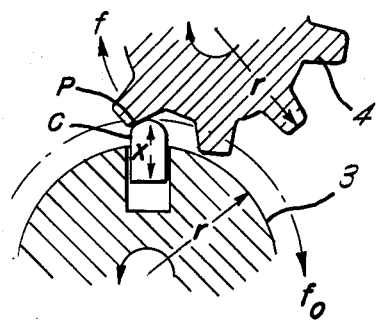
FIG. 3 is a cross-sectional view showing in detail the power transmitting means of the present invention.

The present invention will now be described in detail with particular reference to FIGS. 3 to 5. In FIG. 3, there is a driven gear 4 and a driving gear 3 having a radially sliding teeth C which is slideable in the outward radial direction and is one of a plurality of slide valves positioned equidistant about the circumference of driving gear 3. Consequently, rotation of the driving gear 3 will create a centrifugal force to move the radially sliding teeth C in the outward radial direction to thereby contact and rotate the driven gear 4. However, if the centrifugal force acting on radially sliding teeth C is relatively small and centrifugal action is not really created, then the driven gear 4 will oppose the radially sliding teeth C with a force $f=ma$, which, when $f=fo$, will ultimately cause the radially sliding teeth C to move radially inwardly and return to the resting position without causing any movement of the driven gear 4.

But in practice, radially sliding teeth C are made to be slideable in the direction of the arrow X in FIG. 3, so that, when driving gear 3 rotates, centrifual motion of radially sliding teeth C creates a centrifugal force, $C=mrW^2$. Consequently, rotation of driving gear 3 rotates the driven gear 4 by a turning force F originating from the driven gear 4 and which equals the centrifugal force, $F=(cf)/fo$ $f=fo$ $F=C=mrW^2$.

Figure 4A:
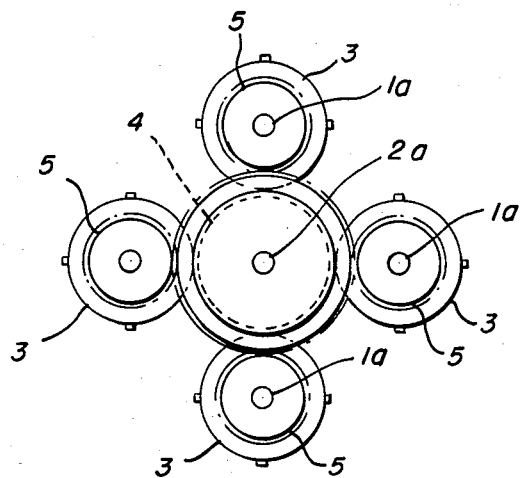
FIG. 4A is a bottom plan view of an embodiment of the present invention.
Figure 4B:
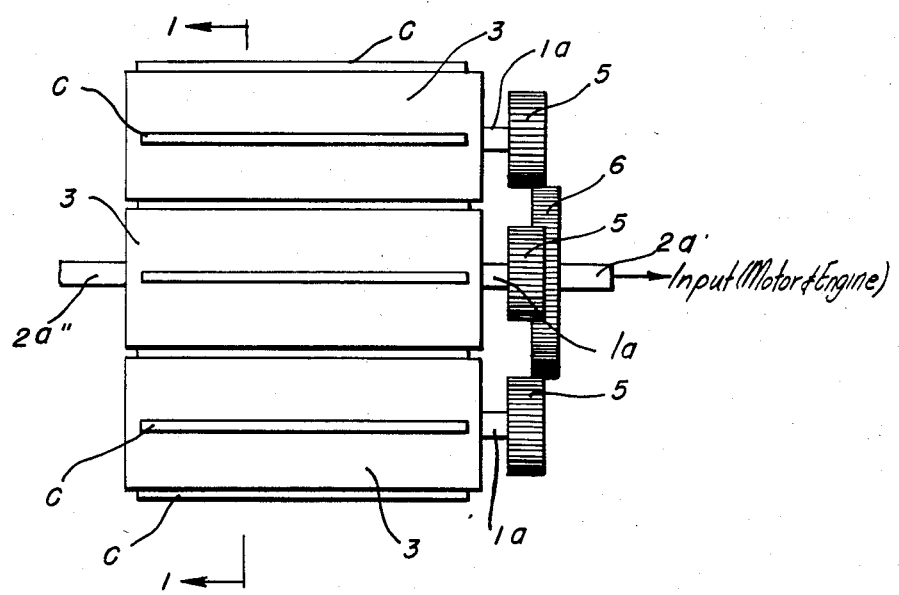
FIG. 4B is a side view of the embodiment of the present invention shown in FIG. 4A.
Figure 5:
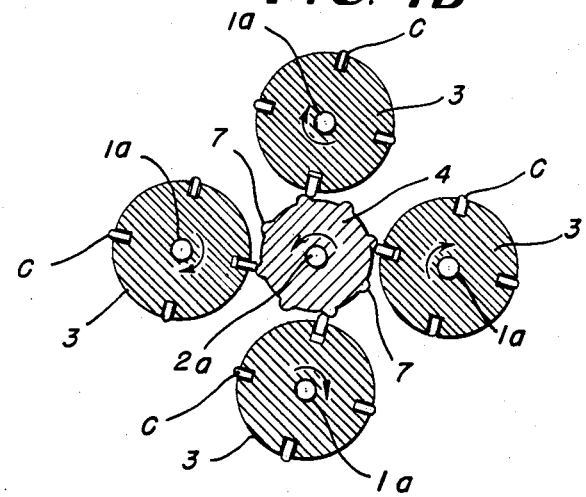
FIG. 5 is a cross-sectional view along line 1—1 of FIG. 4B.

For example, with reference to FIG. 4, driven gear 4 and gear 6 are both positioned on the driven shaft 2a and driving gear 3 and gear 5 are positioned on driving shaft 1a. One end of driven shaft connected to the input shaft 2' in a straight line and the input shaft 2a' is connected to a motor or engine (not shown) through a pulley, etc. whereby power is supplied to the input shaft 2a'. The other end of driven shaft 2a is connected to an output shaft 2a'' for supplying power to a machine (also not shown). In this manner, shafts 1a and 2a are cooperating by means of gears 5 and 6. The gear ratios could vary but, the ratio of the example in FIG. 4 has been selected a 2:1.

The outer periphery of the driving gear 3 is provided with a plurality of radially sliding teeth C and the driven gear 4 is provided with gears 7 of a number which is double the number of radially sliding teeth C on each driving gear 3. The power created by turning driving gears 3 is then transmitted to the gear 7 of the driven gear 4 by the cooperation of a radially sliding teeth C with a point P on the gear 7 (See FIG. 3). In this manner, connecting power to input shaft 2a' will initiate rotation of driven shaft 2a which, by the cooperation of gears 5 and 6, will cause rotation of driving shaft 1a. Accordingly, rotation of driving shaft 1a is transmitted to gear 5 and passes to gear 6 so that gear 6 attains a rotational velocity which is one-half that of the gear 5. The accelerated turning force of driven shaft 2a is therefore initiated by the centrifugal force from the turning of driving gear 3 at a speed higher than driven gear 4. Rotation of driving gear 3 having a plurality of radially sliding teeth C in its outer circumference creates a centrifugal force which acts on the radially sliding teeth C and this force is then transmitted to the driven gear 4 at point P of gear 7 to thereby accelerate the rotation of the driven gear 4. Acceleration of the rotation of driven gear 4 is thereby created by the high velocity turning of driving gear 3 creating a high centrifugal force acting on radially sliding teeth C which is continuously transmitted from gear 5 to gear 6.

As a result of the apparatus of the present invention, rotation of the driven shaft 2a is produced by a small force because the small force required to rotate gear 5 is augmented by the centrifugal force transmitted by radially sliding teeth C to thereby continuously rotate the gear 6, so that, a greatly increased power is realized on the output shaft 2a'' as compared with the power initiated by the input shaft 2a'.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A power machine comprising:
    a driven gear;
    a plurality of driving gears positioned about and cooperating with said driven gear;
    each of said driving gears including a plurality of radially sliding teeth positioned equidistant about the circumference of said driving gears for transmitting centrifugal force to said driven gear;
    said driven gear includes a plurality of fixed gears positioned equidistant about the outer circumference thereof and which cooperate with said radially sliding teeth whereby rotation of said driving gears imparts centrifugal force to said radially sliding teeth which transmit said force to said drive gear upon cooperation with said fixed gears to thereby accelerate said driven gear.

2. A power machine as in claim 1, wherein said driven gear cooperates with a driven shaft and said driving gears each cooperate with a driving shaft whereby rotational movement imparted to said driving shafts is transmitted to said driven shaft.

3. A power machine as in claim 1, wherein each of said driving gears contains X number of radially sliding teeth and said driven gear contains 2X number of fixed gear means.

4. A power machine as in claim 1, wherein four of said driving gears are positioned about said driven gear.

* * * * *